United States Patent [19]

Meyers

[11] 3,961,594

[45] June 8, 1976

[54] REMOVAL OF SEA GROWTH FROM SUBMERGED SHIP HULL SURFACES

[75] Inventor: Bradley E. Meyers, Seattle, Wash.

[73] Assignee: Sea Mesh Corporation, Bellevue, Wash.

[22] Filed: Jan. 4, 1974

[21] Appl. No.: 430,606

[52] U.S. Cl. .......... 114/222; 102/DIG. 2; 102/27 R; 134/17

[51] Int. Cl.$^2$ .......... B63B 59/00; B60S 1/00

[58] Field of Search .......... 114/222; 134/17; 102/27, DIG. 2; 244/134

[56] References Cited

UNITED STATES PATENTS

| | | | |
|---|---|---|---|
| 2,435,986 | 2/1948 | Taylor | 114/222 X |
| 2,752,272 | 6/1956 | Fay | 134/17 |
| 2,930,554 | 3/1960 | Johnson | 244/134 |
| 3,068,829 | 12/1962 | Nuissl | 114/222 |
| 3,731,626 | 5/1973 | Grayson | 102/27 R |
| 3,847,080 | 11/1974 | Eckels | 102/27 R |

*Primary Examiner*—Trygve M. Blix
*Assistant Examiner*—Gregory W. O'Connor
*Attorney, Agent, or Firm*—Christensen, O'Connor, Garrison & Havelka

[57] ABSTRACT

The method for removing sea-growth from submerged ship-hull surfaces by the utilization of an apparatus which comprises a net with a predetermined mesh design made from an explosive cord with pre-determined charge and manufactured in a specific net pattern for obtaining sequential ignition in a predetermined direction.

17 Claims, 10 Drawing Figures

Fig. 2
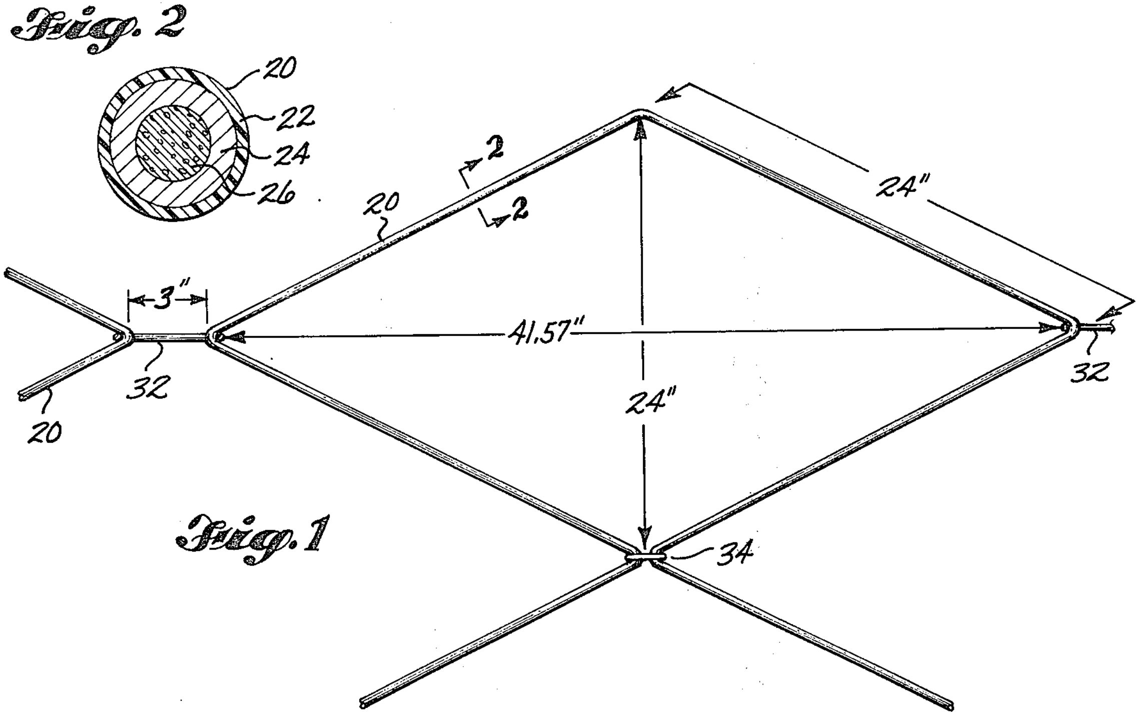
Fig. 1
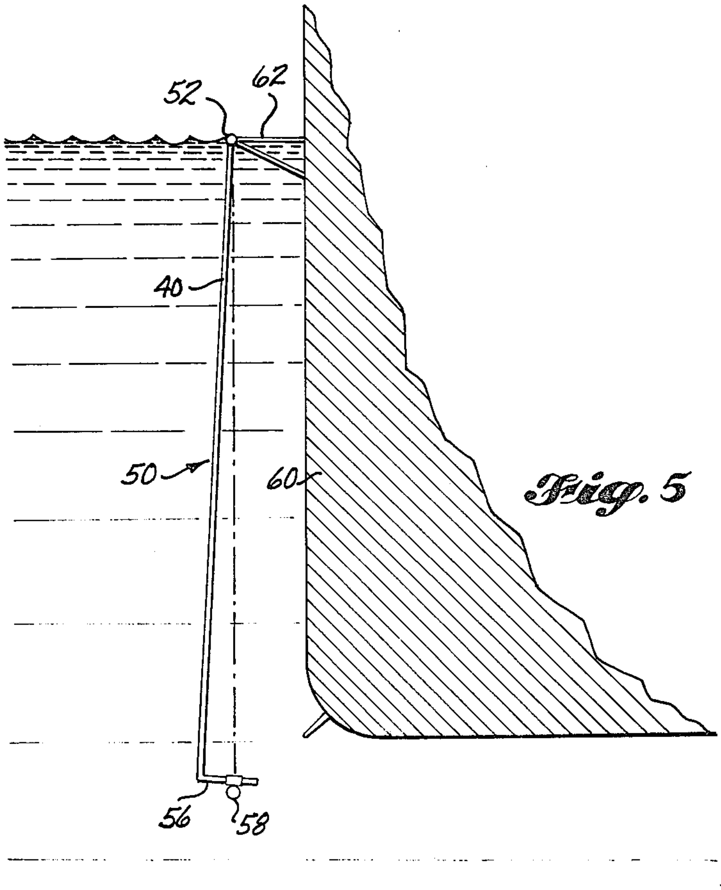
Fig. 5

REMOVAL OF SEA GROWTH FROM SUBMERGED SHIP HULL SURFACES

The method further includes the positioning of the net in a specific mode at a predetermined distance from the submerged hull surface and the initiation of the net at certain points at timed intervals thereby controlling the energy dissipation and the removal of the sea-growth in sections along the ship hull surfaces.

BACKGROUND OF THE INVENTION a. Field of the Invention

The present invention relates to a method of and an apparatus for removing of sea-growth, such as barnacles, weeds, etc., from marine objects, and in particular to the removal of sea-growth from the submerged hull surfaces of ships or the like.

b. Description of the Prior Art

All sea-going ships have to be cleaned periodically, for a minimum of once every 2 years up to as many as three or four times a year. Navy ships, and in particular submarines, may require cleaning every three months in order to maintain their operating efficiency. The regularity of cleaning is predicated on the marine life growth factor in the particular area in which the ship is operating. Various crustaceans and sea moss growth slow a vessel's speed anywhere between a half knot up to 2 knots. Of course, such a reduction in speed causes an economic loss.

The present state of the art still maintains a physical removal process by scraping, sandblasting, or some other scratching process which is normally performed in dry docks. Apart from the cost of dry docking, the abrasive process destroys any remaining anti-fouling paint layers on the hull and these, which might otherwise last for a substantial time, have to be reapplied. A typical scraping machine is shown in U.S. Pat. No. 2,104,062 by Temple.

A different and more sophisticated ship's cleaning device has been disclosed in U.S. Pat. No. 3,068,829 by Nuissl which improved the art of cleaning a ship's hull without putting the ship into a dry dock. The cleaning process is performed by an ultrasonic frequency supplied by an apparatus that travels along the ship's hull and is steered by divers. However, a cleaning process of this type covers a very small area of the hull only and is therefore time consuming. Also, the physical size of such a device and its power requirements might prove it to be impracticable.

In another development, a system is disclosed in U.S. Pat. No. 994,405 by James which would permanently keep the ship's hull free from the attaching of sea growths by providing high tension electricity in the vicinity of the submerged hull so as to impart a shock to animal or aquatic life whereby due to the high tension discharge a shock is imparted to such organisms and they are thereby prevented from attaching themselves. Thus, a permanently installed apparatus is disclosed which at regular intervals will electrocute the complete hull of a ship. This invention sounded correct at the time of disclosure. However, since sea water would act as an electrolyte in such a system, the resulting galvanic action associated with this system would consume sacrificial anode material at an impracticable rate.

In comparison to the present invention as disclosed hereinafter, it appears that the prior art has never been able to produce a workable, efficient system different from the first-mentioned abrasive or scraping system which is still used. The present invention uses accelerated sea-water produced by an expanding gas-bubble pulse and a small amount of shock wave energy which produces a vibratory effect. The combination of these two energy effects when created in calculated controlled amounts will safely remove all sea-growth fouling in the area to it.

The prior art has taught systems utilizing explosives for cleaning purposes but these types of systems were never for cleaning submerged areas and utilized randomly unpredetermined set charges of explosives.

In general, it appears that the present invention provides for a new and improved method and apparatus to be used in the cleaning and/or removing of sea growth, such as barnacles, sea moss, etc., from the submerged areas of various marine objects such as ships, submarines, docks, bridges, pontoons, locks, etc., where such is desired. However, in particular the present invention claims and identifies a new and unique method for removing sea growth from submerged ship hulls more economically and faster than ever before.

SUMMARY OF THE INVENTION

In general, this new apparatus utilizes the cleaning effects produced from initiating a network of light explosive cord in a liquid medium. Upon initiation, the network of explosive cord or mesh disintegrates, producing a gas bubble pulse and a small amount of shock energy. As the gas bubble grows, it pushes with tremedous energy on the sea water which surrounds it, and since water does not easily compress, the sea water is accelerated at a velocity which is near that of the gas bubble. This accelerated sea water, because of the positioning of the net, collides with the marine growth. As mentioned above, a small shock energy is also produced from the net initiation process and this stock wave collides with the marine growth and the surface to which the marine growth is attached and causes the growth and the surface to vibrate for a short amount of time. The combination of the accelerated sea water colliding with the marine growth and the vibratory effect of the shock wave is sufficient to remove the marine growth and leave a clean surface.

The following data and finalization of the present invention was compiled after the idea of using explosive netting arrangement was tested and found to be inoperative as a proper solution until more study, further discovery and required optimums were found. Accordingly, the present invention is now a workable invention comprising an apparatus and a method which successfully has proved to be reliable, economic and completely safe for the removal of sea growth from ship hulls without damage or other harmful effects.

In particular, the apparatus comprises a net made from an explosive cord, such as "Primacord" (a commercial product available in various diameters and having a waterproof wrapping covering a core of pentaerythritol tetranitrate (P.E.T.N.) or cyclotrimethylenetrinitramine (R.D.X.) or the like).

Many different sizes and shapes of mesh for the netting as well as core loads were tested in order to find the optimum and safe arrangement. During the early system-testing a mesh system was used which was interwoven so as to initiated simultaneously, thereby cleaning off all of the marine growth fouling in a single shot. In each case this early system was tested, it did remove the unwanted marine growth but unfortunately, through its simultaneous initiation, did cause potentially damaging energy levels to be transmitted to the ship. By introducing sequential delay units into the system, it effectively reduced whole ship shocks down to safe levels and it still maintained sufficient square foot energy necessary to provide good cleaning effects. In other words, the one single shot was by dividing the net in sections reduced to a series of small shocks.

As will be explained hereinafter, there are basically two types of initiation systems which through practice have proven to be practical for most applications, a horizontal initiation method which was the first system used with a sequential initiation system and a vertical initiation system. Thus, the method of initiating the explosive cord involves a design that successively initiates in a horizontal or vertical controlled direction a plurality of diamonds.

However, the greatest contribution to the present invention was the discovery of the relationship between diamond size, explosive and proper stand-off distance to produce non-damaging cleaning effects to the ship's internal equipment.

The safe effective distance for a 24-inch sided diamond with a 24-inch minor axis and with a core load of 12 grains P.E.T.N. per foot is three feet from the surface to be cleaned. The proper calculation for determining the optimum values is explained in the description hereinafter.

Later on, in the preferred mode, it was found that by slanting the net away from the ship at the ship's bottom of approximately 3 to 5 degrees, even cleaning is produced along the entire surface of the ship. To explain further, as the energy waves produced get closer and closer to the surface of the water, more and more energy venting action occurs; therefore, to compensate, the mesh is brougt nearer to the ship at the surface.

In summary, the method and apparatus for removing sea-growth from the surfaces of an object comprises the steps and the apparatus of a. positioning a netting made of explosive cord having a charge of about 4½ to 25 grains of PETN per foot arranged in a diamond mesh pattern of approximately 9 to 50 inches per side substantially parallel of the surface in submerged environment at preferably an approximate 13 to 75 inches distance, and b. initiating said pattern of diamond mesh completely at once or in predetermined sections at predetermined time intervals, preferably ¼ sec. for vertical and 1–3 sec. for horizontal initiations.

Of course, the present invention has been reduced to actual experiments and various tests were successfully conducted on aircraft carriers, tugs, destroyers, barges and cargo ships. Comparison with areas cleaned by presently known dock scraping systems using sand blasting or the like showed that the present submerged explosive net system as explained and disclosed hereinafter in further detail was superior in smoothness to the ship's hull and that no damage was evident to the weld lines, the paint, bolts or rivets.

In conclusion, it appears that the present invention is an improvement over the existing air-polluting sandblasting sea growth removal art performed in dry docks.

Many unique features and advantages of this system became evident, such as:

1. drastic reduction in total cleaning time;

2. system may be used while a ship is loading or unloading;

3. reduction of cleaning costs;

4. elimination of dry docking for cleaning;

5. non-air-polluting and safe for environment.

It is therefore an object of the present invention to provide for a method and apparatus for the removal of sea-growth from marine objects by utilizing controlled energy dissipation produced by initiation of the apparatus in submerged condition.

It is a particular object of the present invention to provide for a method and apparatus for the removal of sea-growth from the submerged hull surfaces of a vessel by an apparatus which when installed in submerged condition removes the sea-growth within a matter of minutes from the total hull area by a most economic, efficient, completely controlled underwater energy wave system.

Accordingly, the features which are believed to be characteristic of the invention, both as to its organization and method of operation, together with the objects and advantages thereof, will be better understood from the following description considered in connection with the accompanying drawings.

IN THE DRAWINGS

FIG. 1 shows the standard 12 grains/foot diamond pattern and mesh size configuration of the explosive net or apparatus for removing marine growth.

FIG. 2 is the cross-section of the cord taken along line 2—2 of FIG. 1.

FIG. 5 is a cross-section of the net and associated ship hull and shows in particular the submerged positioning.

Figure 3:
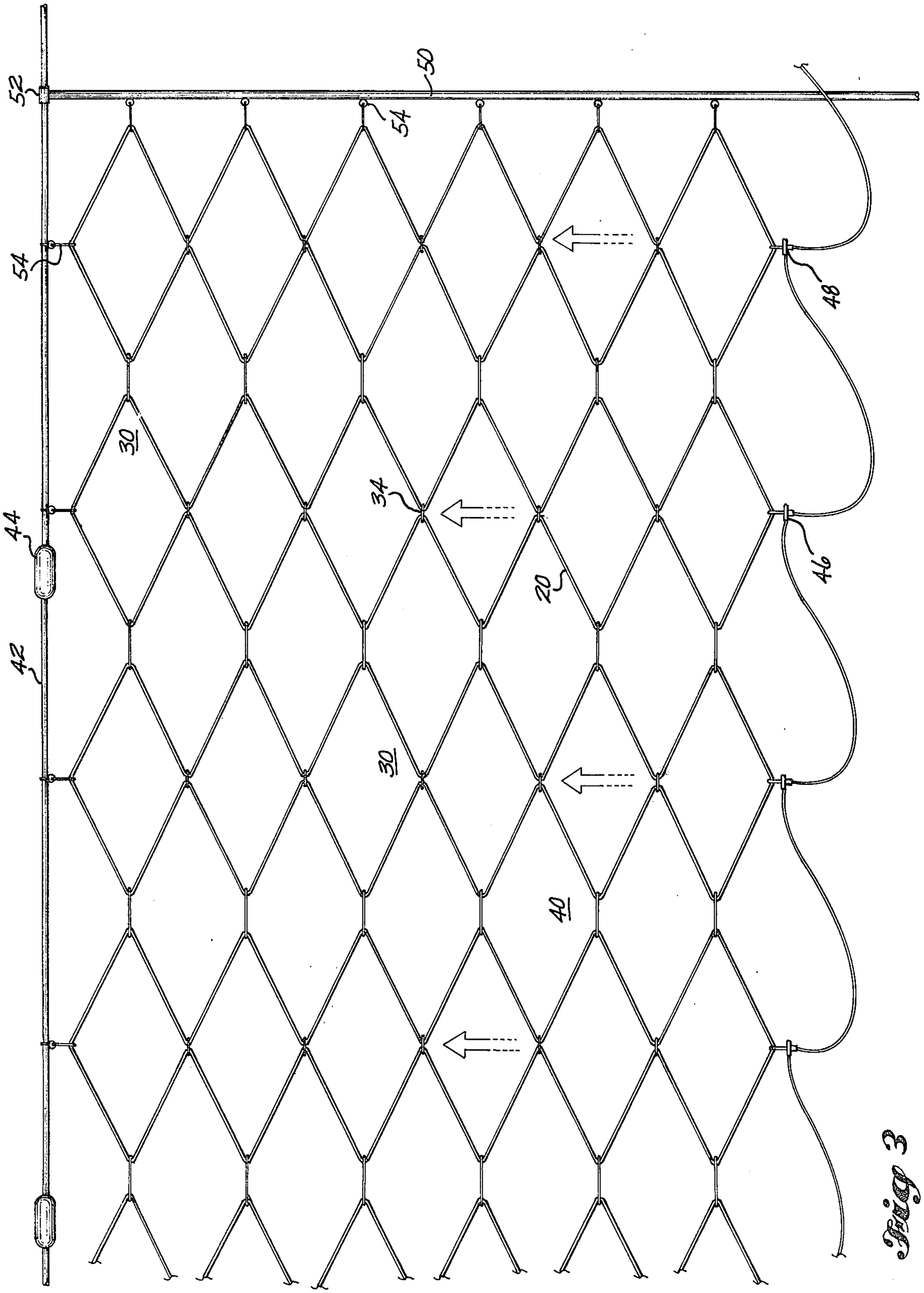
FIG. 3 is a first embodiment of this invention comprising a net arrangement for vertical sequential initiation.

DESCRIPTION OF THE INVENTION:

As described earlier, an explosive mesh cleaning system is constructed using light explosive cord which is assembled in a diamond pattern of predetermined size and explosive cord load.

Referring to FIGS. 1 and 2, there is shown in FIG. 1 a diamond shaped mesh made from cord 20 shown in FIG. 2. A cross-section of the explosive cord 20 is in actual size about 0.125 or ⅛ of an inch in diameter. The outer covering of the cord 20 is a thin flexible plastic jacket 22 of approximately 10 mils in thickness. Inside the plastic jacket 22 is a cloth jacket 24 of approximately 20 mils in thickness. At the center of this cord is the explosive material 26 which may be Pentaerythritol Tetranitrate (P.E.T.N.) or Cyclotrimethylenetrinitramine (R.D.X.) or a similar substance. An explosive core load 26 range of from 4½ grains per foot to 25 grains per foot may, in most applications, safely be used. However, 4½ grain cord may not, in all incidents, propagate well. Twenty-five grain cord, on the other hand, may cause excessive shock to be transmitted to small thin hulled ships which are very old. Therefore, a standard explosive cord 20 was chosen with a core load 26 of 12 grains of P.E.T.N., not only for its safe energy levels on small ships and its reliability, but also for its commercial availability. This material as it is packaged may be shipped as D.O.T. Class C explosive, thereby elminating most of the transportation restrictions imposed upon Class A and B explosives.

Referring back to FIG. 1, the dimensions of the mesh in a 12 grains diamond shape 30 are as follows: 24 inches per side, horizontal axis = 41.57 inches, minor or vertical axis = 24 inches. After experimenting with many shapes (circles, squares, etc.), the diamond pattern 30 was chosen not only for its effectiveness and reliability, but also for its manufacturing simplicity and its shipping compactness when folded together. The connectors 32 and 34 are forming the preferred diamond shape 30; however, the connectors 32 have the additional function of being non-propagative.

Figure 4:
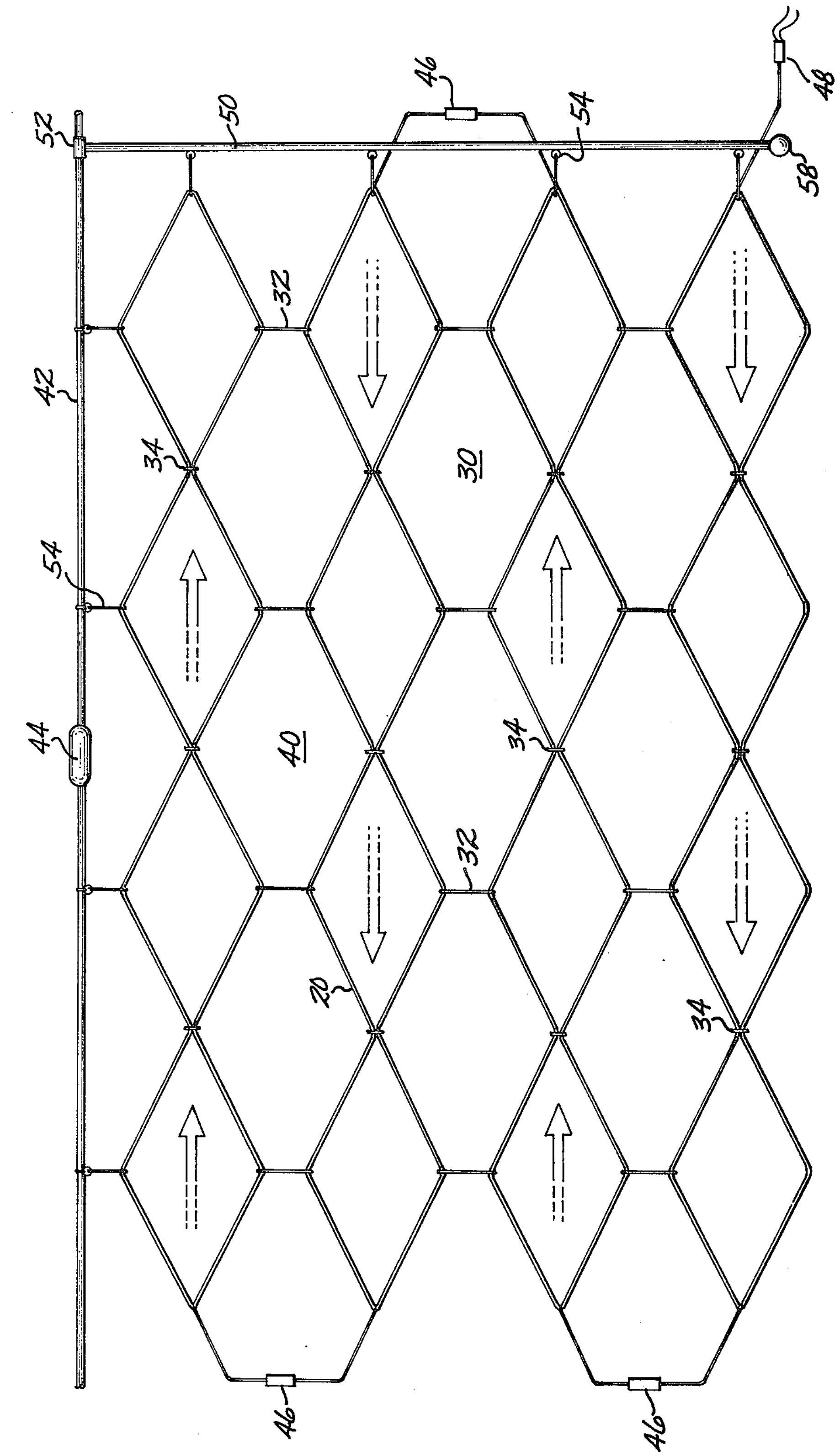
FIG. 4 is a second embodiment comprising a net arrangement for horizontal sequential initiation.

FIGS. 3 and 4 show a mesh installation or netting 40 for a vertical and a horizontal sequential initiation respectively. As illustrated, a floating line 42 using floats 44 or the like carries the explosive netting or mesh 40. As indicated, connectors 32 and 34 are used in order to arrange for the proper diamond shape and to accomplish a controlled direction of ignition, such as in FIG. 3 the initiation is vertical while in FIG. 4 the initiation is horizontal. So that a delay exists between each section in the pattern or in order to divide the pattern in sections for successive initiation, delay units 46 are used which are commercially available. Additional aids are used for positioning the net parallel to the surface to be cleaned from sea growth, such as a mesh alignment pole 50 having a floatline connector 52 and mesh connector rings 54. Furthermore in the most preferable arrangement, the pole 50 is also equipped with a tilt means 56 and alignment weight means 58 for adjusting the net in preferred slant towards the surface. (See FIG. 5.)

As indicated, the delay units 46 in FIG. 3 are arranged in series on the bottom part of the mesh 40 and the delay units 46 in FIG. 4 are alternately located at left and right side of the mesh 40. Each net or mesh 40 is provided with an initiation start point 48 which is activated as soon as the mesh 40 is properly positioned. The above arrangement was a result of considerable experimentation and an explanation of the reasoning behind utilization of a sequential initiation system may be helpful. During the early system testing a mesh system was used which was interwoven so as to be initiated simultaneously, thereby cleaning off all of the marine growth fouling in a single shot. In each case this early system was tested, it did remove the unwanted marine growth but unfortunately it, through its simultaneous initiation, did cause potentially damaging energy levels to be transmitted to the ship. Therefore, with the introduction of sequential delay units 46 into the system, whole ship shocks were effectively reduced to safe levels and still sufficient square foot energy was maintained for good cleaning effects.

The two types of initiation systems which through practice have proven to be practical for most applications are the horizontal initiation method and the vertical initiation method.

The horizontal initiated mesh is very simple to manufacture in long lengths and, therefore, more economical. A disadvantage in the horizontal system is that on the average more mesh diamonds with each shot are initiated; for instance, approximately 11 times more diamonds per shot than with the vertical system, therefore, 11 times more energy is transmitted. The energy levels produced by each system are completely safe and will not damage the ship's internal equipment, hull, or protective paint system; in fact, extrapolation of existing naval shock and damage data indicated that the energy levels produced during horizontal sequential initiations would need to be increased by at least 20 times before any shock-induced equipment damage might occur.

The energy levels produced by the horizontal system are however greater and, although they are not great enough to cause damage, they will transmit a high sound level to the interior of the ship. The psychological effects on anyone hearing this high sound level would be great and therefore might prove injurious for future sales of the system. Therefore, the vertical system should preferably be used on all inhabited vessels and the horizontal system only on barges, docks, and other uninhabited objects.

FIG. 5 shows partly a cross-section of a ship's hull 60 and mesh system 40 as it is suspended from the ship's sides. A floating stand-off device 62 is used to hold the floatline 42 and mesh system 40 at the correct distance from the ship's sides or surface 60. Experimentation has shown that if the cord 20 is too close to the ship, the result will be an outlining or focusing effect leaving an outline of the diamond's 30 dimensions. In other words, the only areas which will be very clean will have the distinctive outline of the diamond's 30 dimensions. The stand-off device 62 provides a means by which this focusing effect is avoided by having the mesh 40 at a far enough distance so that individual energy fields merge and blend into one great out-of-focus energy field.

In addition, the mesh alignment pole 50 and mesh 40 have been tilted away from the hull surface 60 at the ship's bottom. A tilt of approximately 3° to 5° is created to produce even cleaning along the entire surface of the ship. This tilt is utilized in the most preferred embodiment of the present invention as has been explained, to accomplish energy venting compensation.

The slight tilt of the netting 40 is caused by sliding the weight 58 along the side arm 56 of the pole 50. The dash-dot line represents the line of gravity.

Figure 10:
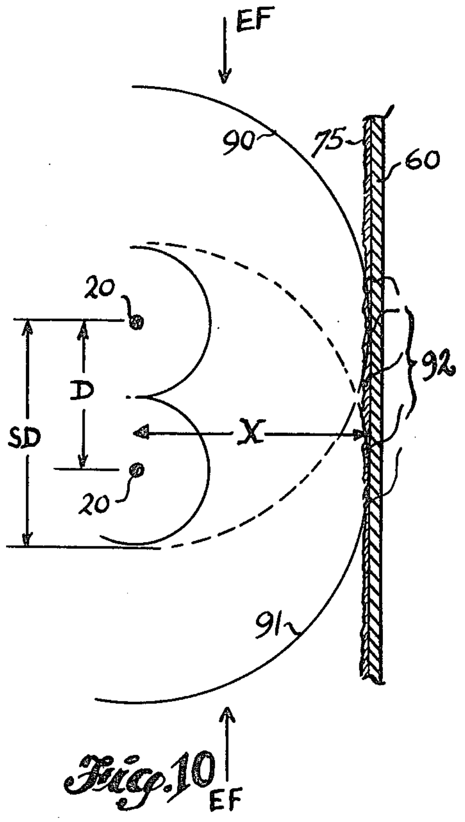

Explicit information in relation to the proper determination of the optimum distance is described hereinafter and illustrated in FIG. 10.

Figure 6:
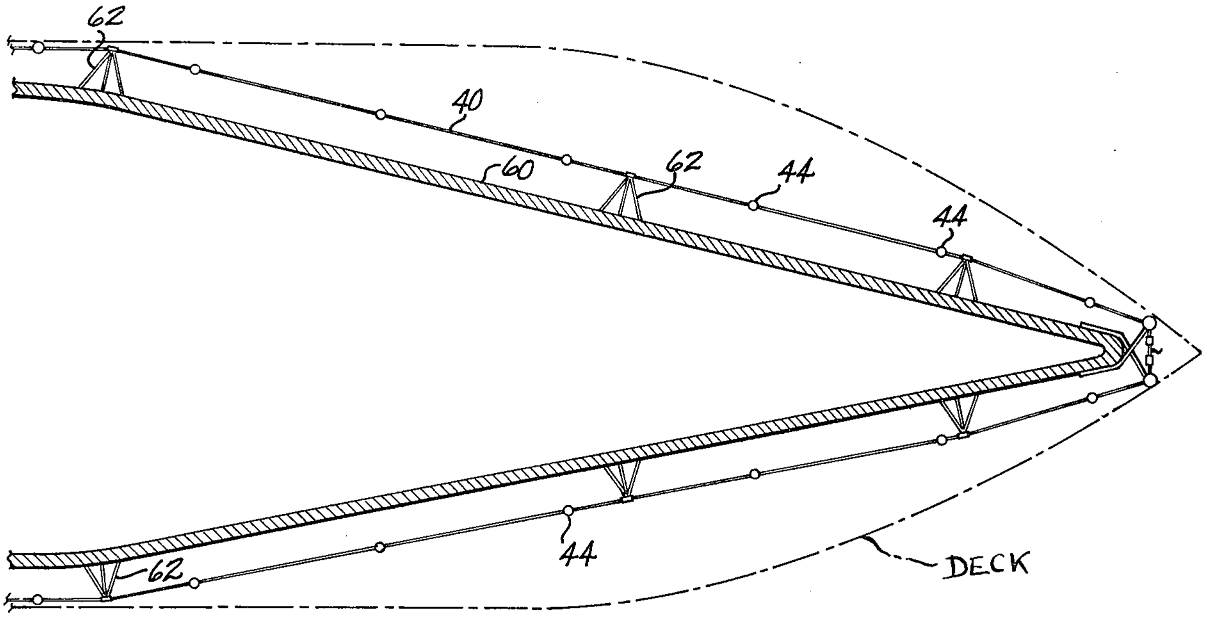
FIG. 6 is a top view of a net deployed about the bow of a marine vessel, taken at water level intersection.

FIG. 6 shows how the floatline 42 and stand-offs 62 may be deployed around the bow of a ship at water level.

Figure 7:
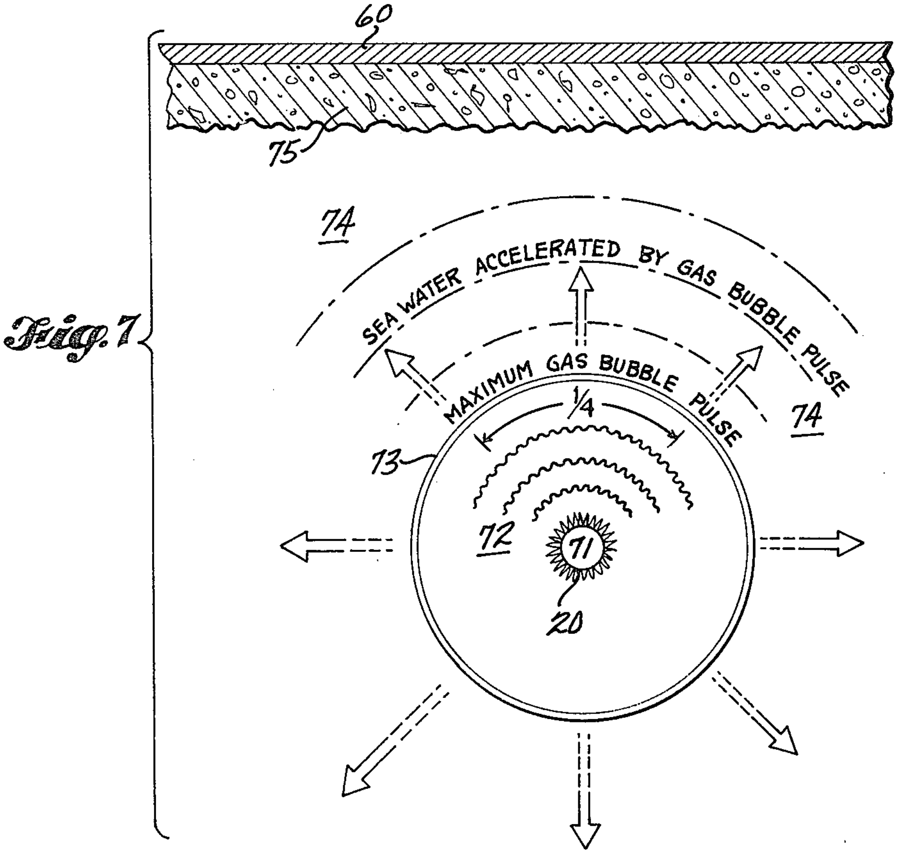
FIG. 7 is a diagram portraying the energy dissipation of shock and gas bubble pulse upon cord initiation.

FIG. 7 illustrates a cross-section of the explosive cord during initiation and its energy dissipation toward the hull surface 60, which is approximately ¼. As the cord 20 is detonated, it disintegrates at 71 and produces shock waves 72 and a gas bubble pulse 73. This gas bubble pulse 73 pushes on the surrounding sea water 74 causing it to accelerate.

The shock waves 72 and the accelerated sea water 74 then collide with the sea growth 75 and the hull surface 60 with an energy level of approximately 25,000 gs. for a time duration of about 43 microseconds. The ship's hull surface 60, however, after receiving this energy will vibrate for approximately 2 milliseconds. The sea growth 75 breaks up into small fragments and is swept away by the accelerated sea water.

Thus, in analyzing the operation of the present invention, the basic principle is the use of explosive means for cleaning the surface from sea-growth and in order to accomplish this, the explosive means should be properly distributed parallel to that surface. It could be further imagined that one develops a thin material carrying the explosives in a well distributed fashion so that the proper amount of explosives or optimum energy per square foot of surface is obtained. The present invention accomplishes this proper distribution by using the explosives in a net having a diamond mesh and in accordance of a simple equation:

$$(\tfrac{1}{4}\, G/A) = E$$

where:

G = the total amount of explosives in grains used in the cord length to make up the one diamond. Because the explosive cord, as shown in FIG. 7 and FIG. 10 dissipates its energy in a circular direction, only ¼ of the energy is directed to the surface, thus the dissipation = ¼ G.

A = The rectangular square feet area a given diamond would cover when initiated, which is approximately twice the area of the diamond itself, or equals the minor times major axis.

E = Energy factor.

Experimentation has proven that in order to clean a ship's surface efficiently, an energy fact E of at least 3.00 must be used. Experimentation has also proven that an energy factor E of at least 4.00 may produce excessive vibrations in some ship designs; therefore, an optimum energy factor from 3.4 to 3.5 is adhered to so that an effective and safe cleaning operation is produced.

The following examples apply to the most frequently used and commercially available cord load sizes within the range acceptable for safety and efficiency.

EXAMPLE 1

The area A of the diamond in FIG. 1 in square feet would be $$24 \times 41.57/144 = 6.93 \text{ square feet.}$$

The total $G$ of the diamond having a cord of 12 grains/ft would be 8 × 12 = 96 grains.

The energy factor $$E = \tfrac{1}{4}\ 96/6.93 = 3.46. \qquad \text{(OK)}$$

EXAMPLE 2

The same calculation for a 48-inch side diamond with 25 grains/ft $$\tfrac{1}{4}\ G = 400/4 = 100$$

$$A = 27.6$$

$$E = 100/27.6 = 3.623. \qquad \text{(not OK)}$$

EXAMPLE 3

$$\tfrac{1}{4}\ G = 416/4 = 104$$

$$A = 30.06$$

$$E = 104/30.06 = 3.459. \qquad \text{(OK)}$$

EXAMPLE 4

For a 9-inch side diamond with 4½ grain/ft $$\tfrac{1}{4}\ G = 13.5/4 = 3.375$$

$$A = 0.975$$

$$E = 3.375/0.975 = 3.46. \qquad \text{(OK)}$$

It should be noted that the diamond is preferably deployed to have its sides and its minor axis of substantially equal lengths.

Figure 8:
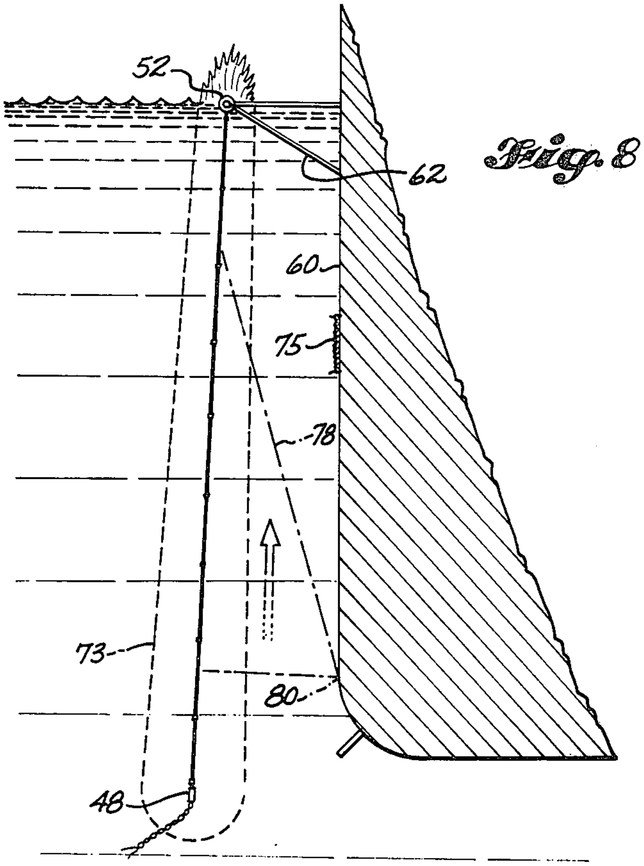
FIG. 8 is a schematic showing of the theoretical energy dissipation in a vertical direction when utilizing a net as illustrated in FIG. 3.

FIG. 8 shows the imagined paths of the shock and gas bubble energy fields during horizontal initiation. The mesh 40 is initiated at point 48. The velocity of the shock energy traveling toward the hull's surface 60 is approximately 6,600 feet per second. The velocity at which the cord is detonating along the mesh is approximately 20,000 feet per second; therefore the energy wave along cord 20 is traveling roughly three times faster along the ship hull surface 60 than the shock wave is traveling towards the ship hull surface 60; thus an energy angle 78 is formed. The gas bubble pulse 73 travels along behind the shock wave 72 front sweeping the vibrating sea-growth off.

Figure 9:
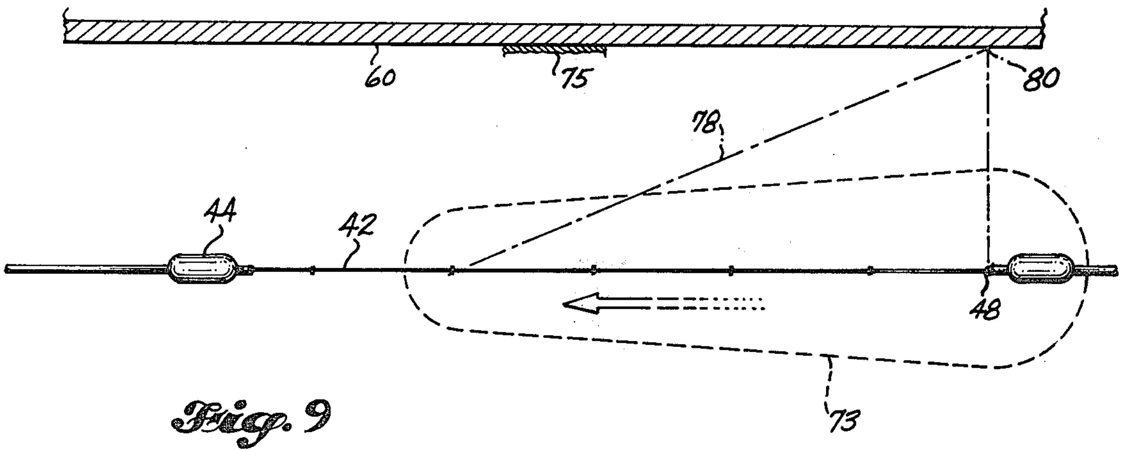
FIG. 9 is a schematic showing of the theoretical energy dissipation in a horizontal direction when utilizing a net as illustrated in FIG. 4, and FIG. 10 explains the stand-off distance.

FIG. 9 shows the imagined energy paths during vertical initiation, where the same theory applies as for FIG. 8. In short, the explanation as per diagrams in FIGS. 7–9 show that the energy dissipation comprises a shock wave and a gas bubble pulse, both attacking the sea growth and, furthermore, illustrates the existence of the moving shock wave having a triangular shape 78 with an apex 80 that moves like a vibratory scraper over the sea growth 75 and destroys its structure while a sweeping bubble 73 action removes by its pressure the particles from the surface 60.

In the above discussions and examples it has been shows that the design of the diamond and cord load are related to each other in order to obtain the required energy factor. Thus it has been shown that the:

a. minor axis or D (See FIG. 10) equals 24 inches for 12 grains/ft;

b. minor axis or D equals 50 inches for 25 grains/ft.;

c. minor axis or D equals 9 inches for 4½ grains/ft.

As explained for FIG. 5, a stand-off distance is necessary. Referring to FIG. 10, which is a cross-section at the minor axis or D of a given diamond, it has been found that the optimum result of the energy field occurs when the expansion of both cords 20 hit the surface 60 as illustrated by field lines 90 and 91, and in particular in the area 92 where the sea-growth 75 is present. Furthermore, it appeared that the optimum stand-off distance SD was substantially equal to 1½ × D, and thus it has been found that $X$ = Stand-off Distance or 1½ × D.

Although the particular preferred embodiments of the invention have been illustrated and described, it should be understood that various changes and modifications may be made without departing from the invention, and it is intended to cover in the appended claims all such changes and modifications as come within the true spirit and scope of this invention.

Now, therefor, I claim:

1. The method of removing sea growth from submerged ship hull surfaces, comprising the steps of;

a. forming a network from an explosive cord;

b. positioning the network substantially parallel and in untouching predetermined spaced relationship from the surface, and, c. initiating the cord.

2. The method as claimed in claim 1 wherein the step of forming said network comprises the steps of calculating explosive cord load from the range of 4½ – 25 grains per foot P.E.T.N. or the like and arranging the cord in diamond mesh shape for an energy factor in the range of $$E = 3.4 \text{ to } 3.5 = (\tfrac{1}{4}\,G/A)$$

wherein:

E = said energy factor;

G = total of grains used in one diamond, and

A = the squared area in feet obtained by minor axis multiplied by major axis of the one diamond.

3. The method as claimed in claim 2 wherein the step of forming the network includes a. arranging a series of diamond shapes from one explosive cord length together in a section;

b. forming a plurality of such sections;

c. tying non-propagating connector means between adjacent sections, and d. interconnecting the sections by delay initiating means for sequential firing.

4. The method as claimed in claim 3, wherein the step of positioning includes:

a. Determining said spaced relationship by multiplying the diamond minor axis by 1½;

b. utilizing floating means, stand-off means and submerged vertical aligning means to place and hold said network at said spaced relationship from said surface.

5. The method of claim 2 wherein said diamond mesh shape includes nonpropagative connector means connecting adjacent elements of said diamond mesh.

6. The method of claim 1 wherein said explosive cord is connected together in said network by nonpropagative connectors.

7. The method of removing sea-growth from submerged ship hull surfaces comprising the steps of;

a. manufacturing a network from explosive cord have a core load of approximately 12 grains of P.E.T.N or the like per foot arranged in a pattern of diamond shaped mesh each having a minor to major axis of approximately 24 to 40 inches respectively;

b. positioning the network substantially parallel to the submerged hull surface, carrying said associated sea-growth, at a distance of approximately 36 inches, and c. initiating the explosive cord.

8. The method as claimed in claim 7 wherein the step of manufacturing includes the step of arranging a plurality of diamond shaped mesh in sections together separated by non-propagating means and interconnected by detonating delay means arranged in series.

9. The method as claimed in claim 8 wherein the sections are arranged as to form a plurality of horizontal bands to be initiated in sequential order of approximately 1–3 seconds delay by said detonating delay means.

10. The method as claimed in claim 8 wherein the sections are arranged as to form a plurality of vertical bands to be initiated in sequential order of approximately ¼-seconds delay by said detonating delay means.

11. Apparatus for removing of seagrowth from submerged ship hull surfaces comprising in combination a. a network made from explosive cord and connecting means;

b. aligning and positioning means connected to said network for installing said network at a substantially parallel and untouching predetermined spaced relationship from said surface, and c. initiating means attached to said cord for detonating said network.

12. The apparatus of claim 11 wherein said explosive cord is formed into a network of substantially diamond mesh shapes.

13. The apparatus of claim 11 wherein said explosive cord is formed into said network with nonpropagative connectors extending between said explosive cord.

14. The apparatus of claim 13 wherein a plurality of sections of cord form said network and said sections are interconnected for sequential detonation by a delay initiating means.

15. The apparatus of claim 14 wherein said sections fire sequentially at intervals of from one to three seconds.

16. The apparatus of claim 12 wherein said explosive cord contains 4½ to 25 grains P.E.T.N. or the like per foot and wherein said diamond mesh is sized to provide an energy factor in the range of $$E = 3.4 \text{ to } 3.5 = (\tfrac{1}{4}\,G/A)$$

wherein

E = said energy factor;

G = total grains of P.E.T.N. or the like used in one diamond, and

A = the area in square feet obtained by multiplying minor axis length by major axis length of the one diamond.

17. The apparatus of claim 11 wherein said aligning and positioning means includes stand-off means positioned between said surface and said network, floating support means for said network and vertical aligning means extending downwardly from said floating support means to support said network in a substantially parallel relationship to said surface.

* * * * *